United States Patent [19]

Steely, Jr. et al.

[11] Patent Number: 6,081,887

[45] Date of Patent: Jun. 27, 2000

[54] SYSTEM FOR PASSING AN INDEX VALUE WITH EACH PREDICTION IN FORWARD DIRECTION TO ENABLE TRUTH PREDICTOR TO ASSOCIATE TRUTH VALUE WITH PARTICULAR BRANCH INSTRUCTION

[75] Inventors: Simon C. Steely, Jr., Hudson, N.H.; Edward J. McLellan, Holliston; Joel S. Emer, Acton, both of Mass.

[73] Assignee: Compaq Computer Corporation, Houston, Tex.

[21] Appl. No.: 09/191,869

[22] Filed: Nov. 12, 1998

Related U.S. Application Data

[63] Continuation of application No. 09/078,113, May 13, 1998, abandoned.

[51] Int. Cl.[7] .................................................. G06F 9/32
[52] U.S. Cl. ......................................................... 712/239
[58] Field of Search .................................... 712/234, 233, 712/236, 239, 240, 235, 237, 238

[56] References Cited

U.S. PATENT DOCUMENTS

| 5,564,118 | 10/1996 | Steely, Jr. et al. | 712/240 |
| 5,752,014 | 5/1998 | Mallick et al. | 712/240 |
| 5,903,751 | 5/1999 | Hoyt et al. | 712/238 |
| 8,646,975 | 1/1999 | Shiell | 712/240 |

OTHER PUBLICATIONS

Emer et al. (A language for describing predictors and its application to automatic synthesis) Internation Symposium on computer architecture 1–11, Jun. 1997.

Yeh, T., et al., "Two–Level Adaptive Training Branch Prediction," (1991).

Keller, J. et al., "A Superscaler Alpha Processor with Out–of–Order Execution," *Microprocessor Forum*, (Oct. 1996).

Gieseke, B.A., et al., "A 600MHz Superscaler RISC Microprocessor With Out–of–Order Execution," (undated).

Gwennap, L., "Digital 21264 Sets New Standard—Clock Speed, Complexity, Performance Surpass Records, But Still a Year Away," *Microprocessor Report*, 10(14) :1–11, (Oct. 28, 1996).

Gieseke, B.A., et al., "A 600MHz Superscaler RISC Microprocessor With Out–of–Order Execution," IEEE International Solid–State Circuits Conference, (1997).

*Primary Examiner*—Meng-Ai T. An
*Assistant Examiner*—Gautam R. Patel
*Attorney, Agent, or Firm*—Hamilton, Brook, Smith & Reynolds, P.C.

[57] ABSTRACT

A technique for predicting the result of a conditional branch instruction for use with a processor having instruction pipeline. A stored predictor is connected to the front end of the pipeline and is trained from a truth based predictor connected to the back end of the pipeline. The stored predictor is accessible in one instruction cycle, and therefore provides minimum predictor latency. Update latency is minimized by storing multiple predictions in the front end stored predictor which are indexed by an index counter. The multiple predictions, as provided by the back end, are indexed by the index counter to select a particular one as current prediction on a given instruction pipeline cycle. The front end stored predictor also passes along to the back end predictor, such as through the instruction pipeline, a position value used to generate the predictions. This further structure accommodates ghost branch instructions that turn out to be flushed out of the pipeline when it must be backed up. As a result, the front end always provides an accurate prediction with minimum update latency.

18 Claims, 5 Drawing Sheets

SYSTEM FOR PASSING AN INDEX VALUE WITH EACH PREDICTION IN FORWARD DIRECTION TO ENABLE TRUTH PREDICTOR TO ASSOCIATE TRUTH VALUE WITH PARTICULAR BRANCH INSTRUCTION

CROSS REFERENCE—RELATED APPLICATIONS

This application is a continuation of a prior U.S. application Ser. No. 09/078,113, now abandoned filed May 13, 1998, entitled "Stored Predictor With Index Counter To Support Multiple Predictions In Update Shadow."

BACKGROUND OF INVENTION

This invention relates generally to data processing systems and more particularly to pipeline processors.

BACKGROUND

The parallel execution of instructions has been known for some time to be one of the most effective ways to improve the performance of a particular data processor architecture. Strategies for exploiting instruction level parallelism include deep pipelines, super scalar construction and, out of order issue, among others.

In order to achieve the maximum performance benefit, such techniques have resulted in an increase reliance upon speculative execution, that, is the execution of instructions before all input values are known. A standard technique for coping with an unknown input value is to guess the value and then proceed with the speculative execution, eventually resolving whether the guess was correct or not. If the guess was correct, then the processor can proceed as planned. If however, the guess was wrong, the processor needs to reset its state back to the state it was in at a point before the guess was made, before resuming operation with the correct input value. The process of generating a guess for an unknown input value is more formally called prediction.

Branch prediction is the most commonly seen form of prediction in the context of pipeline processors. In this case, the value being predicted is the address of an instruction to execute after a conditional branch instruction. In other words, a prediction is made as to whether the target address of the conditional branch will be taken, or whether the next sequential instruction will be executed. This information is typically needed very early in a pipeline processor, so that instruction fetch can be directed to fetch the correct instruction. On the other hand, the actual branch result is typically not determined until the instruction executes far down the pipeline. While accurate branch prediction can substantially improve performance by allowing for speculative execution of instructions before a branch is actually resolved, as pipelines get deeper, the negative effect of an incorrect branch prediction increases.

In general, branch predictors perform two operations. The first operation, referred to as making a prediction, is the process of making a guess about whether the branch will be taken or not taken. A second operation, called update, is where the truth about the direction actually taken by the branch instruction, is used to train the predictor to help it make better predictions in the future. Update of the predictor is not possible until the actual branch result is known.

Unfortunately, especially in pipeline processors, there can be a large number of cycles from when an instance of a branch is predicted until the truth about the direction of the branch can be learned. For pipeline processors that also reorder instructions, the predictor cannot be updated until the branch instruction actually retires, because a prior fetched instruction may trap the machine and flush the branch out of the pipeline.

An additional difficulty exists when the length of the pipeline becomes greater than the number of software instructions that may be located within a tight loop. For example, DO or FOR type control statements are often used in software programs to execute a section of code a specified number of times or until the specified condition is met. These type of control statements may often be nested such that one iterative construct may be imbedded within another, such that the iterative statement implemented by a conditional branch instruction located within the inner portion of the nested statements forms a very tight loop. In a super scalar pipeline of several stages that also reorders instructions, the inner most branch instruction may need to be predicted multiple times before the first instance of the same branch instruction is retired.

An additional challenge thus exists to accomodate predictions for each instance of a tightly nested loop instruction which may not retire prior to the exit of the first instance of the branch. One approach for dealing with branch prediction in this instance is to do nothing about the multiple instances of the same branch underneath this so-called update shadow.

However, another type of predictor is a two stage predictor where the first stage is indexed by the program counter of branch instructions that are fed into a pipeline. The first stage outputs a history of the directions that are taken or not taken by the branch at that particular address. The second stage is indexed by the past history information from the first stage (and perhaps combined with other program counter bits), to output a prediction based upon the most often taken branch direction for the particular address.

If both stages of this type of predictor are located in series, this means that the prediction stage result is not known until both stages are accessed. This causes a problem, since the next branch to be predicted cannot be known until the prior one is predicted, and since both stages of the predictor must be accessed to make a prediction. This is referred to as the predictor-latency problem.

One such branch predictor was described in U.S. Pat. No. 5,564,118 entitled "Past History Filtered Branch Prediction," issued to Steely, Jr. et al. on Oct. 8, 1996, and assigned to Digital Equipment Corporation of Maynard, Mass. That type of branch predictor includes a memory for storing a history of predictions of a given branch instruction over a previous number of occurrences. The structure remains responsive to the actual branch pattern as determined by all completed branches, while predicting whether the branch instruction should or should not be taken. The history pattern, may for example, be used to address a counter which keeps a weighted average of the actual resolution of the branch instruction. There may be sets of such counters, implemented as up-down counters, in order to accomodate multiple branch instructions with this scheme.

One problem with this approach is that the time required to update the predictor is longer than the time between required predictions. This predictor latency problem becomes an issue if part of the data needed to create a new prediction includes the results of the immediately preceding prediction. A second problem occurs if a prediction is needed immediately following a trap condition which restarts the instruction fetch mechanism. A multiple cycle prediction mechanism would not be capable of producing a new prediction when needed.

Another issue with this approach to prediction is that each execution of a branch instruction within an update shadow will obtain the same prediction results. This approach therefore does not work well if the branch exhibits an oscillating pattern, such as with a 50/50 distribution of the branch being taken and not taken. This problem is referred to as the update latency problem.

One solution to the update latency problem might be to use a predictor that updates using its own predictions rather than the truth of the actual result of the branch instructions. With this scheme however, the predictor becomes polluted with updates from predictions made in the update shadow of a mis-predict. These inaccurate past histories therefore adversely effect the accuracy of further predictions.

SUMMARY OF THE INVENTION

The present invention provides a solution to both the predictor latency and update latency problems within a stored predictor. In particular, the invention uses a one stage stored predictor connected to the front end of an instruction pipeline which is trained from a truth based predictor connected to the back end of the pipeline.

The one stage stored predictor is accessed in one instruction cycle, which solves the predictor latency problem.

The update latency problem, that is, the problem of having all prediction in a branch shadow requiring different prediction is solved by two additional components.

The first component is to permit the front end stored predictor to accommodate multiple predictions by including an index counter, called a position counter, that specifies which one of multiple front end stored predictions is currently being used.

A second component, placed within the back end predictor, provides multiple predictions for each branch instruction, and forwards the multiple predictions to the front end stored predictor.

The front end stored predictor also passes along to the back end predictor, such as through the instruction pipeline, a position counter value used with each prediction. This enables the back end predictor to determine the proper positions within which to store each of the multiple predictions it makes.

By holding multiple predictions in each front end entry, it is thus possible to generate accurate predictions for multiple instances of the same branch in an update shadow. This, therefore, provides a structure for dealing with the update latency problem.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead is being placed upon illustrating the principles of the invention.

DETAILED DESCRIPTION OF THE INVENTION

Figure 1:
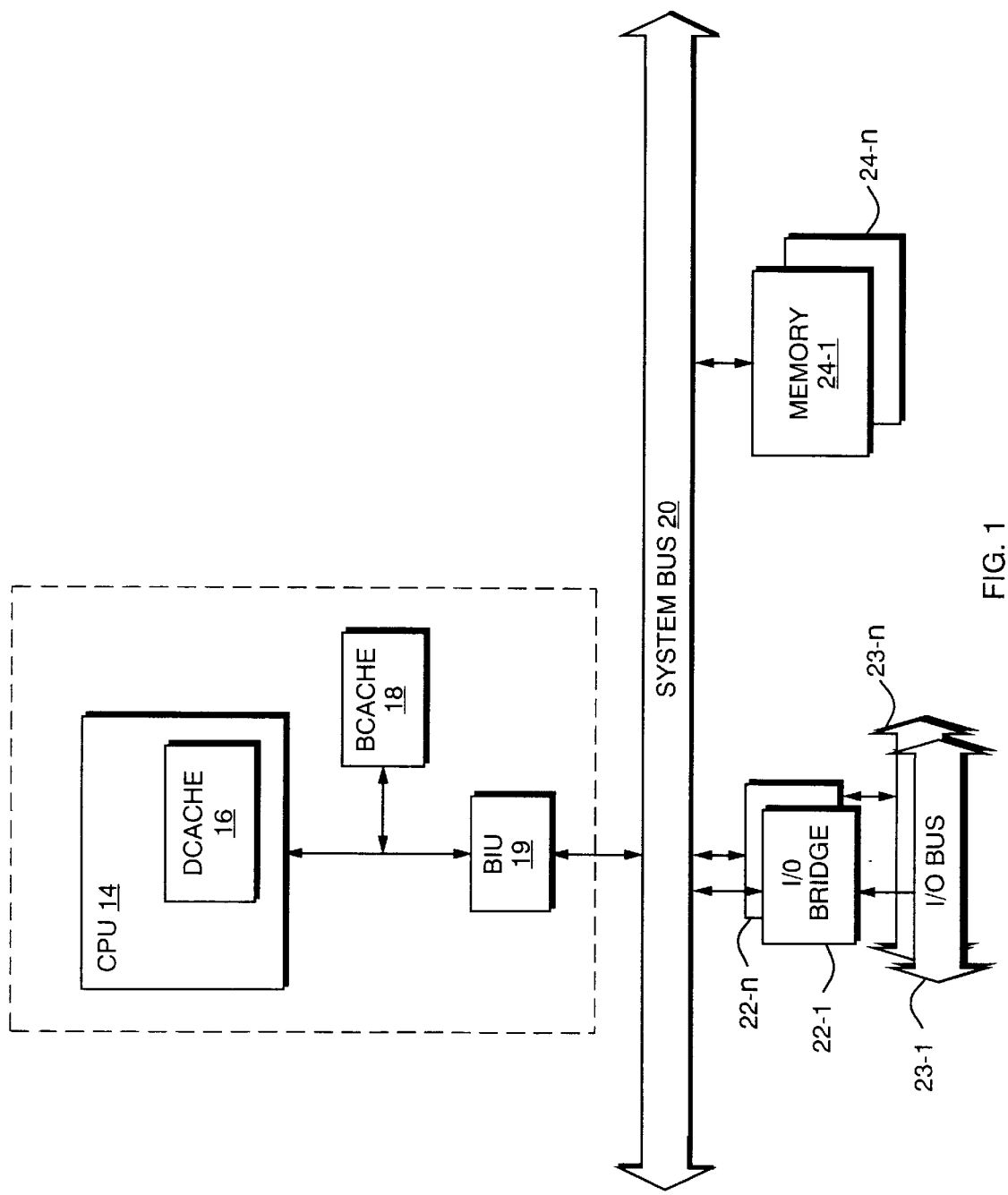
FIG. 1 is a block diagram of a data processing system in which a stored predictor according to the invention may be used.

Turning attention now to the drawings more particularly, FIG. 1 is a block diagram of a data processing system 10 including a central processor 12 which is connected by a system bus 20 to multiple input/output (I/O) bridges 22-1, . . . ,22-n that each control a corresponding I/O bus 23-1, . . . ,23-n. One or more memories 24-1, . . . ,24-n are typically also connected to the system bus 20.

The processor 12 typically includes a central processing unit (CPU) chip 14, which contains a local or internal cache memory 16, an external or off chip cache 18, and a bus interface unit (BIU) 19.

The system 10 may be implemented, for example, in accordance with the Alpha architecture developed by Digital Equipment Corporation of Maynard, Mass. Within the context of the Alpha architecture, the internal cache 16 is typically referred to as the data cache, or "DCACHE", and the external cache is referred to as the backup cache, or "BCACHE".

The present invention is a technique for implementing a branch predictor within the CPU 14. In particular, the branch predictor of the invention may be applied to a high speed short-tick instruction pipeline such as may be used by the CPU 14. However, before discussing the branch predictor in greater detail it is first helpful to understand the general architectural arrangement of the CPU 14.

Figure 2:
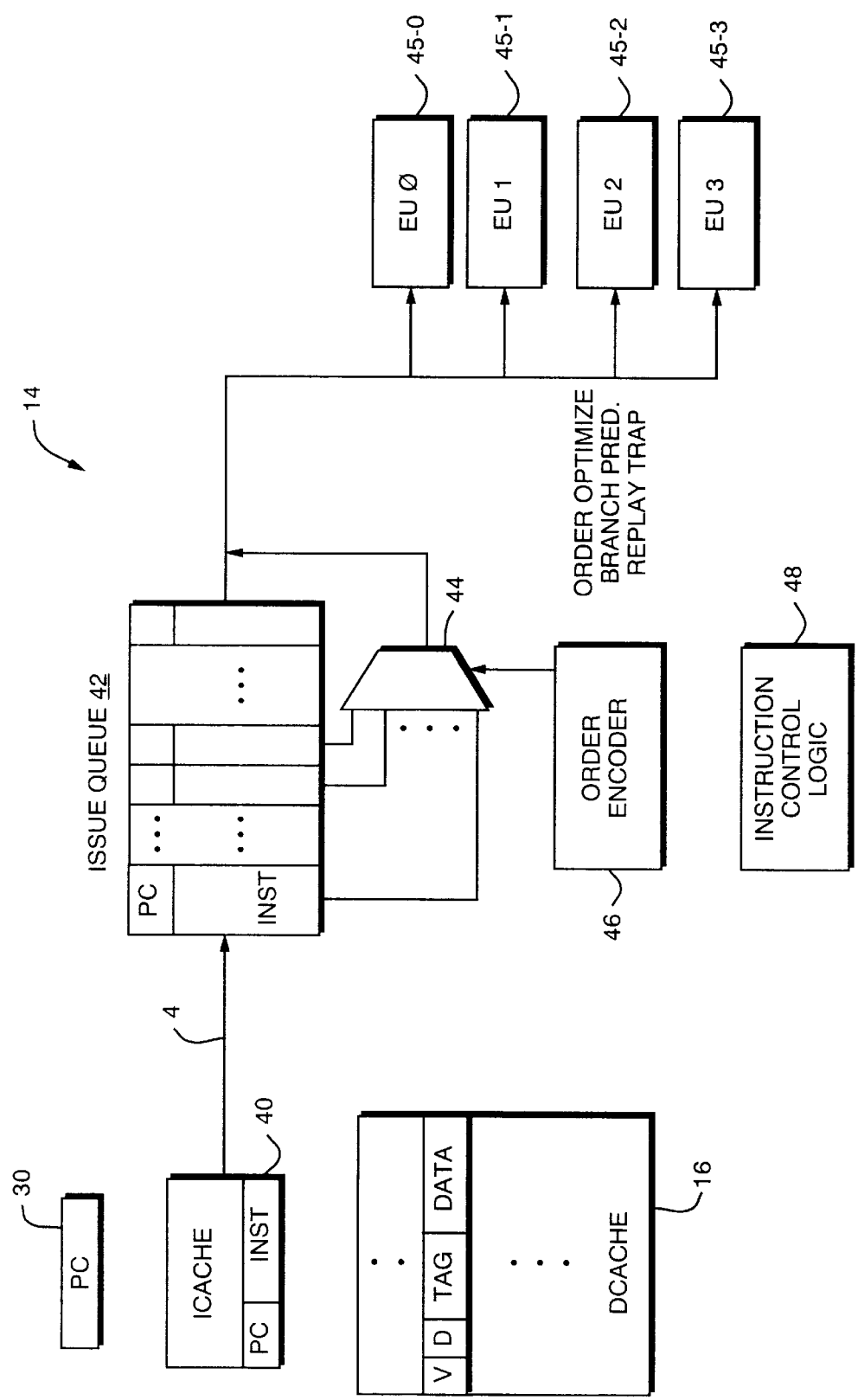
FIG. 2 is a more detailed diagram of the central processing unit showing an out of order instruction pipeline.

As shown in FIG. 2, the CPU 14 includes, among other items, an instruction cache 40, an instruction pipeline or issue queue 42, an instruction selector 44, an order encoder 46, instruction control logic 48, and multiple execution units 45-0, 45-1, 45-2, and 45-3 (collectively, the execution units 45). Although no explicit connections are shown in FIG. 2 between the various elements, such as between the internal cache 16, the instruction cache 40, the execution units 45, the order encoder 46, and instruction control logic 48, it should be understood that appropriate control signal and bus connections permit the instruction units 45 to complete the processing of instructions in a known manner. The multiple execution units 45 permit more than one instruction to be operated upon at a given time.

As previously mentioned, the CPU 14 is a short tick, pipelined, out of order execution processor in which instructions are not necessarily executed in the same order in which they are specified by the programmer. Rather, the instructions are typically handled as follows. First, an instruction, or multiple instructions, are fetched from a memory location 24 or one of the caches 16 or 18. It is then placed in the instruction cache 40. The instructions are stored in the instruction cache 40 in an order specified by a program counter 30. The instructions are then clocked out of the instruction cache 40 into the issue queue 42. The issue queue 42 maintains the instruction operation code and operand bits of each instruction (INST) along with a program counter data field (PC) indicating the memory address of the instruction(s).

The issue queue 42 uses the selector 44 and order encoder 46 to reorder the actual sequence of execution of any number of instructions. While the issue queue 42 normally operates on a first in, first out basis, certain events may dictate that it is more efficient for the selector 44 and order encoder 46 to select instructions from the issue queue 42 to be executed out of order. In addition, the issue queue 42 typically also implements instruction replay logic which permits the reissuance of any previous instructions which are pending in the queue 42.

In accordance with known techniques, any number of events may dictate that is more efficient to execute instructions out of order, and these techniques are not particularly pertinent to the present invention. It is sufficient here to say that this may depend upon a number of factors, such as the present state of the internal cache 16 or external cache 18, the type of instructions in the queue 42, the specific combination of instructions pending in the queue 42, or other factors.

In addition, and more to the nature of the present invention, it should be understood that instructions may issue on a speculative basis before the results of a particular instruction, such as a branch instruction, are known. In particular, instructions in one possible path of a branch instruction may be executed on a conditional basis in the "shadow" before the results of the test condition specified by the branch instruction are actually known.

Figure 3:
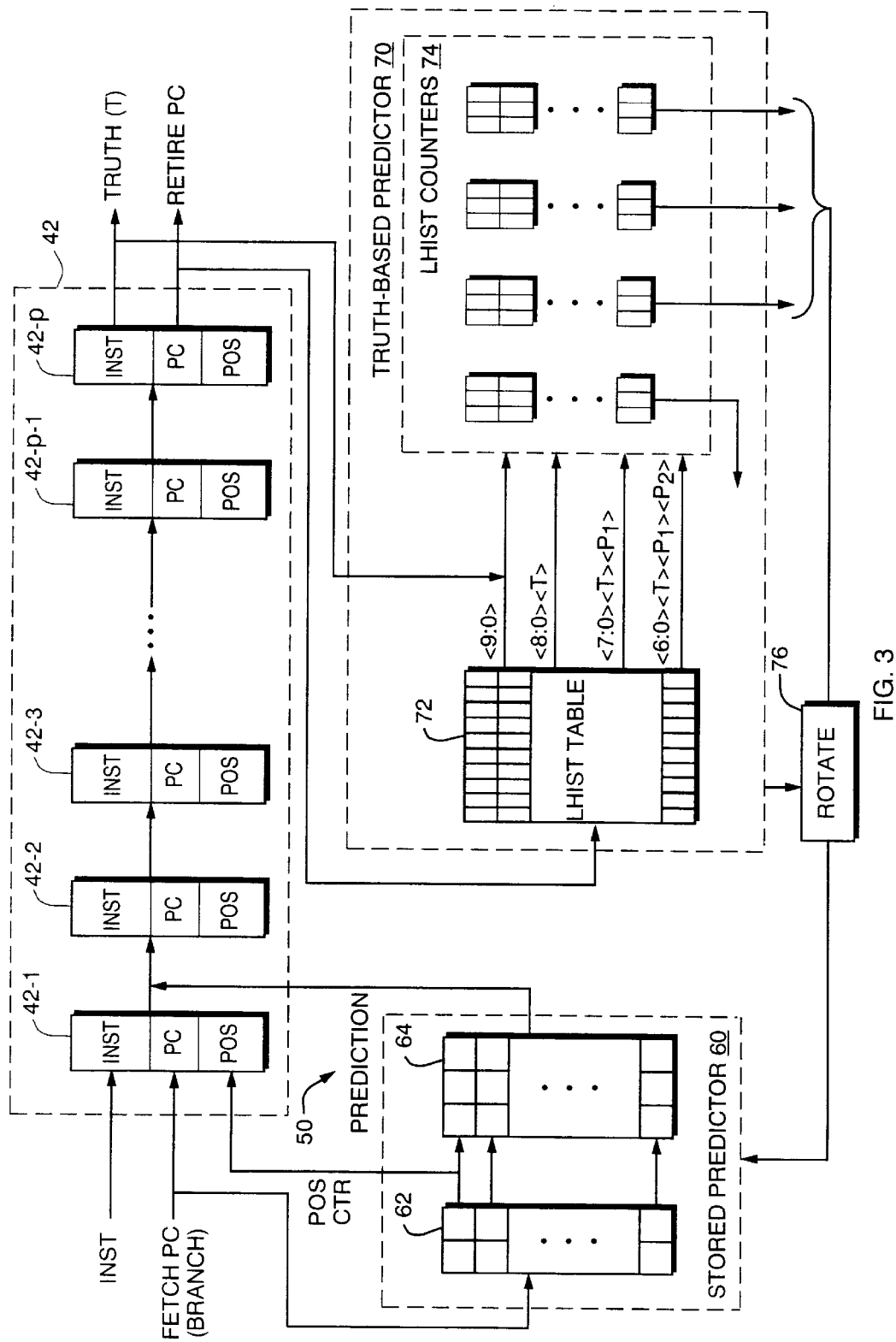
FIG. 3 is a block diagram of a stored predictor implemented in accordance with invention.

FIG. 3 is a more detailed block diagram of the instruction control logic 48 and portions of the issue queue 42 which are used to implement a branch predictor 50 according to the invention. The branch predictor 50 is of a general type known as a two-level adaptive branch predictor, and consists of a stored predictor 60 and truth based predictor 70. The stored predictor 60 includes a position counter table 62 and prediction table 64. The truth based predictor 70 consists of a history table 72, a number of history counters 74, and rotate logic 76.

The front end or stored predictor 60 stores in the prediction table 64 a number of predictions for each of a number of branch instructions. In the illustrated embodiment, the prediction table 64 is a 1024 by 3 bit random access memory (RAM) with each memory location storing three predictions. The prediction table 64 may therefore store predictions for up to 1024 different branch instructions at the same time.

The contents of each entry in the prediction table 64 correspond to the logic values, e.g. taken (logic true or "1") or not taken (logic false or "0") of the next three predictions for the execution of the branch instruction at the corresponding table address. The prediction table 64 is addressed and maintained in a manner which will be understood shortly, through feedback of data from the truth based predictor 70.

The position counters 62, of which there are a like number as the number of prediction table entries (e.g. 1024), are used to index the three prediction table 64 entries to determine which one is presently active. A particular position counter 62 is incremented each time that a corresponding branch instruction is accessed, as will be understood shortly.

The truth based predictor 70, and in particular the local history table 72, maintains a history of the actual results of a number of executions of each particular branch instruction. In the illustrated embodiment, the local history table 72 contains 1024 locations each of which is ten bits wide. In other words, each history table entry 72 maintains a history of the actual result of the last ten executions of a branch instruction located at a particular memory location.

The purpose of each local history counter 74 is to record, from information available in the local history table 72, whether a past branch instruction was "taken" or "not taken" a majority of the time. The history counters 74 are therefore incremented or decremented depending upon whether the branch instruction was taken or not taken.

The local history counters 74 are addressed by several combinations of the bits of local history table 72. In the illustrated embodiment, four of the history counters 74 are addressed by selected portion of the history table 72 as follows:

ADDRESS 1 LHIST [9:0]
ADDRESS 2 LHIST [8:0] [T]
ADDRESS 3 LHIST [7:0] [T] [$P_1$]
ADDRESS 4 LHIST [6:0] [T] [$P_1$] [$P_2$]

The history table location pointed to by ADDRESS 1 is the particular history table counter updated by the current operation. ADDRESS 2, ADDRESS 3 and ADDRESS 4 are used in making future predictions.

In the above table, LHIST [9:0] represents the unshifted contents of the addressed history table 72 location; LHIST [8:0] [T] is the shifted output, i.e., the lower order nine bits of the addressed history table location, concatenated with the truth bit of the present branch result; LHIST [7:0] [T] [$P_1$] is the shifted table location concatenated with the truth and a prediction bit; and LHIST [6:0] [T] [$P_1$] [$P_2$] is the shifted history table location concatenated with the truth bit and two prediction bits.

The number of counters 74 depends upon the number of bits of history in each table entry. For example, in the illustrated embodiment there are 10 bits of history, implying 1024 history counters 74. Though it is possible that the four addresses will specify different counters, it is also possible that the contents of the four shifted history table 72 locations as concatenated with the truth T and prediction bits $P_1$ and $P_2$ may actually all access the same counter. For example, if the addressed history table entry is all zeroes, and if the truth and prediction results are also zero, then all four address outputs will point to the same history counter, if the truth and prediction results are also zero. Therefore, each of the history counters 74 is actually implemented as a multi-port counter capable of being accessed by up to four inputs.

The predictions $P_1$ and $P_2$ are desired from the addressed history counters 74. One counter lookup is really only performed in order to increment and update itself. This first address is the preshifted output of the history table; but since the truth T is already known it is not used in the prediction. It is instead used to increment or decrement a first target history counter 74. That history counter 74 provides what is the most likely direction for the next execution of the recently completed branch instruction. That particular counter is then incremented or decremented based upon the actual result on "truth" of the execution of the conditional branch instruction.

To understand more fully how the truth T and prediction bits $P_1$ and $P_2$ are determined, consider that across the top of FIG. 3 is a representation of the pipeline 42 including the multiple stages 42-1, 42-2, 42-3 . . . , 42-p-1, 42-p. As previously mentioned, an instruction op code (INST) and program counter (PC) value for each instruction executed are fed to the first stage of the pipeline 42. In additon, a position counter (POS) value provided by the stored predictor 60 is also stored together with each branch instruction. The instruction code, program counter, and position value are then propagated through the pipeline stages until exiting from the pipeline at a retire stage 42-p. The counter 74 directly addressed by the ten bits of the LHIST entry 72, e.g. by ADDRESS 1, are used merely to update the LHIST table 72 with the truth T when known from the retire stage 42-p. The other three counters are accessed to provide information for the stored predictor 60. The truth T of the result of a conditional branch instruction is known when a conditional branch instruction reaches the retire stage 42-p.

The first prediction bit $P_1$ is provided by combining the truth bit T with the history bits LHIST [8:0] to generate the address ADDRESS 2 as previously described. This address, in turn, accesses one of the local history counters 74 to provide bit $P_1$.

Similarly, the second prediction bit $P_2$ is determined by the output of the local history counter 74 addressed by ADDRESS 3.

The counter addressed by ADDRESS 4, in turn, provide a third prediction bit $P_3$.

Rather than directly providing the three selected history counter 74 outputs directly to the stored predictor table 64, the three history counter 74 outputs are first fed to the rotate logic 76. Rotate logic 76 in turn provides these three prediction bits $P_1$, $P_2$, $P_3$ to the prediction table 64. The rotate logic 76 accommodates a situation where there are multiple branch instructions in flight in the pipeline 42 at the same time. Specifically, if there have been subsequent uses of the same stored prediction, any resulting future predictions must be inserted in the correct location of the stored predictor 60.

In the event of a mis-predicted instruction, any instructions that are caught in mid-progress through the pipeline 42 must be flushed out of the pipeline 42 and possibly replayed. As conditional branch instructions are replayed, they will eventually cause the local history counters 74, and hence the predictions, to be corrected as subsequent instructions are run through the pipeline 42.

A ghost branch condition sometimes occurs because the index counter 62 is automatically incremented each time that a branch instruction is accessed. For example, because each of the position counters 62 is updated each time a conditional branch instruction is fetched, they may be placed in a state which is offset from where they should be after a pipeline flush. In other words, the position counter 62 has been updated by ghost branch instructions that were in flight in the pipeline but never actually retired.

In the preferred embodiment, this ghost branch condition is ignored. As the ghost branch instructions shuffle out of the retire end of the pipeline, they therefore simply do not update the stored predictor 60. Eventually, the position counters will return to a valid prediction state and the stored predictor will be retrained properly once a non-ghost-branch instruction retires.

However, in other scenarios, it may be possible to feedback the truth of the mispredicted branch to the back-end predictors to extract a new prediction for the correct instruction path once it is fetched. However, it was determined for the preferred embodiment that the overhead of updating with the actual branch result was not cost effective, since the stored predictor will eventually retrain itself after only a few cycles.

Figure 5:
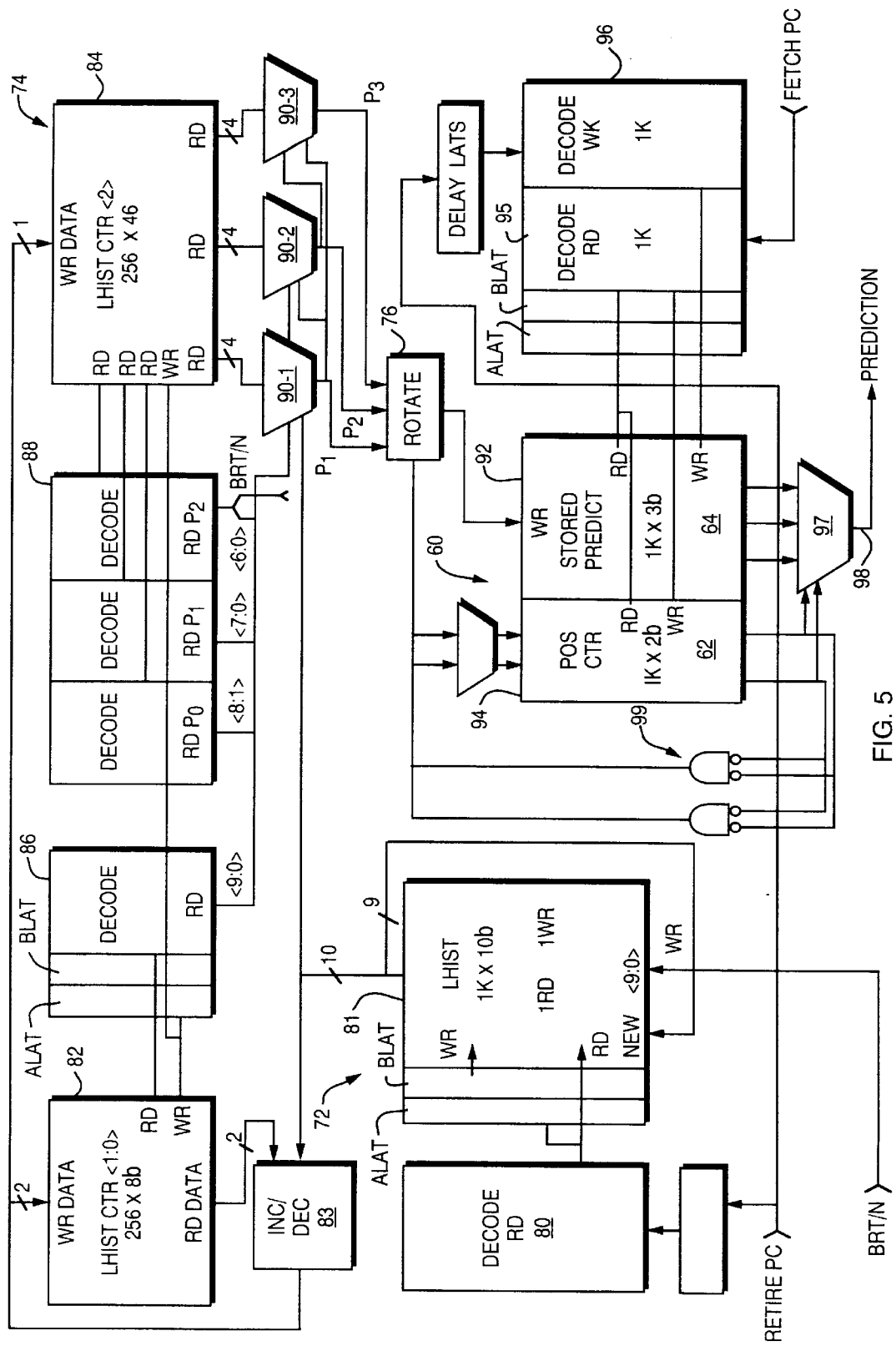
FIG. 5 is a more detailed circuit diagram of the stored predictor.

FIG. 5 is a more detailed circuit diagram of a preferred embodiment of the predictor in accordance with the invention. As shown in the figure, the LHIST table 72 has a read port addressed by the fetch program counter 30 through read decode logic 80. On the write port, data is provided by feeding back the nine most significant bits of the output together with the single bit T indicating the truth from the result from the retire stage 42-p.

In this embodiment, the LHIST counters 74 are implemented in a manner which splits the lower order bits [1:0] from the upper order bit [2]. The splitting provides a more efficient implementation of the saturating counters. Specifically, the most significant bit (MSB) portion of the counter is placed into a separate array because it is the only counter bit which requires multiple read/write ports. The least significant bits (LSBs) need only be read and written to update their value with the true branch direction, and therefore can be implemented in a smaller, two port memory. The LHIST counters 74 are therefore preferably implemented as a first set 82 of 256 eight bit storage arrays and a second set 84 of 256 four bit storage arrays, implementing the least significant bits [1:0] and most significant bit [2], respectively.

The increment decrement logic 83 controls the writing of data to the first array 82 and second array 84, given the two bits of read data from the first array 82 and single bit provided by the read ports 90.

Figure 4:
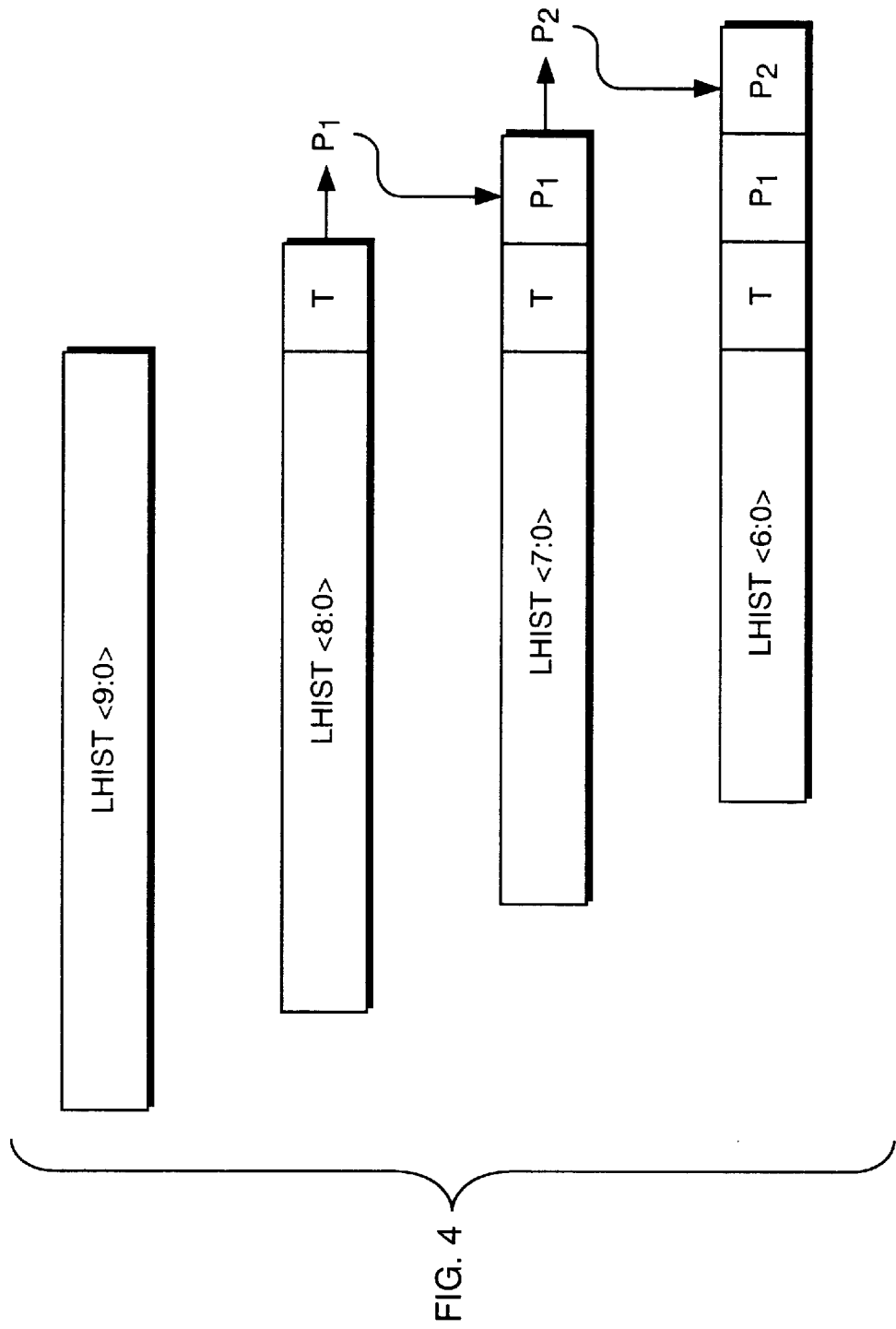
FIG. 4 illustrates how multiple predictions are generated.

The counters 74 are also multi-port in the sense that they need to support up to three read accesses and one write access on each cycle. The decode logic for the write port receives the ten bits LHIST [9:0] as previously described. The read decode logic 88 for the three read ports are presented with the concatenated history, truth, and prediction bits as previously described in connection with FIG. 4. The branch not-taken [BRT/N] signal, provided by the retire stage 42, is also presented together with shifted bits of the LHIST addressed location. Three column decode logic circuits 90-1, 90-2, 90-3 provide the column decodes necessary to support the three read ports.

On any given cycle, the rotate logic 76 selects the desired order for the prediction bits $P_1$, $P_2$, $P_3$ to be fed to the stored predictor 60.

The stored predictor 60 consists of a 1K×3 bit memory array 92 and position counters 62 consisting of a 1K×2 bit memory array 94 as already described. The position counters 62 are addressed on the write port by the retire PC. The position counters 62 are addressed on a read port by the contents of the fetch PC as provided by the fetch stage 42-1. The contents of the addressed position counter 62 are then used to select one of the three stored prediction bits as the prediction 98 to be fed to the pipeline 42. The counter logic 99 increments the contents of the addressed position counter 62 during each cycle that the processor fetches a conditional branch instruction.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A branch predictor for use with a data processor which includes an instruction pipeline wherein multiple conditional branch instructions are pending at the same time in various stages, the branch predictor apparatus comprising:

(a) a stored predictor, connected to a fetch stage of the instruction pipeline, the stored predictor accepting a stored predictor input value, and providing as an output a stored prediction value to enable the instruction pipeline to continue processing of a particular conditional branch instruction, the stored predictor further comprising:

(ii) an index counter associated with each one of a plurality of fetch program counter values of the particular conditional branch instruction, each index counter containing an index counter value indicating one of several candidate predictions to use for a next serial instance of the same conditional branch instruction; and (iii) a storage array containing a number of addressable locations corresponding to the number of index counters, wherein each location in the storage array stores the multiple candidate predictions;

(b) a truth based predictor, connected to a retire stage of the instruction pipeline, the retire stage occurring after the fetch stage, the truth based predictor accepting a truth based predictor input value and a truth value indicating the actual result of the particular conditional branch instruction, and providing a truth based prediction value of the next execution instance of the particular conditional branch instruction as an output, and the index counters being connected to the instruction pipeline so that the stored predictor passes to the truth based predictor, through the instruction pipeline, in a forward direction from the fetch stage towards the retire stage an index counter value used with each prediction, to enable the truth based predictor to associate the truth value with a particular conditional branch instruction.

2. An apparatus as in claim 1 wherein the stored predictor input value is a program counter location of the particular conditional branch instruction in the fetch stage.

3. An apparatus as in claim 1 wherein the truth based predictor input value is a retire stage program counter value.

4. An apparatus as in claim 1 wherein the stored predictor provides the stored prediction value within a time frame associated with one cycle time of the instruction pipeline.

5. An apparatus as in claim 1 wherein the multiple predictions are stored in each location and represent predictions for multiple serial instances of the particular conditional branch instruction.

6. An apparatus as in claim 1 wherein the index counter value indicates which prediction to use for the next serial instance of the particular conditional branch instruction.

7. An apparatus as in claim 1 wherein the truth based predictor makes multiple predictions and the stored predictor uses them serially.

8. An apparatus as in claim 1 wherein the multiple conditional branch instructions may be processed by the retire stage of the instruction pipeline in an order which is different from the order in which they are processed by the fetch stage of the instruction pipeline.

9. A branch predictor for use with a data processor which includes an instruction pipeline wherein multiple conditional branch instructions are pending at the same time in various stages, the branch predictor apparatus comprising:

(a) a stored predictor, connected to a fetch stare of the instruction pipeline, the stored predictor accepting a stored predictor input value, and providing as an output a stored prediction value to enable the instruction pipeline to continue processing of a particular conditional branch instruction, the stored predictor further comprising:

(ii) an index counter associated with each one of a plurality of fetch program counter values of the particular conditional branch instruction, each index counter containing an index counter value indicating one of several candidate predictions to use for a next serial instance of the same conditional branch instruction; and (iii) a storage array containing a number of addressable locations corresponding to the number of index counters, wherein each location in the storage array stores the multiple candidate predictions;

(b) a truth based predictor, connected to a retire stage of the instruction pipeline, the retire stage occurring after the fetch stage, the truth based predictor accepting a truth based predictor input value and a truth value indicating the actual result of the particular conditional branch instruction, and providing a truth-based prediction value of the next execution instance of the particular conditional branch instruction as an output; and such that the index counters are connected to the instruction pipeline so that a given index counter value is passed through the instruction pipeline in a forward direction from the stored predictor to the truth based predictor, to enable the truth-based predictor to associate the truth value with a particular conditional branch instruction, and so that the index counter value is available to be used to order the multiple prediction values provided from the truth based predictor to the stored predictor.

10. A method for branch prediction for use within a data processor that uses an instruction pipeline wherein multiple instructions are pending at the same time in various stages the method of branch prediction comprising the steps of:

(a) providing a stored prediction value, from the fetch stage of the instruction pipeline, the stored prediction value enabling the instruction pipeline to continue processing of a particular conditional branch instruction, the step of providing a stored prediction value further comprising the steps of:

(i) providing an index counter value associated with each one of the plurality of possible fetch program counter values of the particular conditional branch instruction, each index counter value indicating one of several candidate predictions to use for a next serial instance of the same conditional branch instruction;

(ii) storing in a number of addressable locations in a storage array the multiple candidate predictions;

(b) determining a truth-based prediction value of the next execution instance of the conditional branch instruction, the determining step made from the contents of a retire stage of the instruction pipeline, and the retire stage occuring after the fetch stage, and the truth-based prediction value depending upon a truth value indicating an actual result of the conditional branch instruction, (c) passing an index counter value used with each prediction through the instruction pipeline to the step of determining a truth-based prediction value, the index counter values passing through the instruction pipeline in a forward direction from the fetch stage towards the retire stage, to enable the step of determining a truth-based prediction value to associate the truth value with a particular conditional branch instruction.

11. A method as in claim 10 wherein the stored predictor value is determined from a program counter value of the particular conditional branch instruction located in a fetch stage in the instruction pipeline.

12. A method as in claim 10 wherein the truth based predictor value also depends upon a retire program counter value provided by a fetch stage of the instruction pipeline.

13. A method as in claim 10 wherein the step of providing a stored prediction value determines the prediction value within a time frame associated with one cycle time of the instruction pipeline.

14. A method as in claim 10 wherein the multiple predictions represent predictions for multiple serial instances of the same conditional branch instruction.

15. A method as in claim 10 wherein the index counter value indicates which prediction to use for the next serial instance of the particular conditional branch instruction.

16. A method as in claim 10 wherein the truth based predictor makes multiple predictions and the stored predictor uses them serially.

17. A method as in claim 10 wherein the multiple conditional branch instructions may be processed by the retire stage of the instruction pipeline in an order which is different from the order in which they are processed by the fetch stage of the instruction pipeline.

18. A method for branch prediction for use within a data processor that uses an instruction pipeline wherein multiple instructions are pending at the same time in various stages, the method of branch prediction comprising the steps of:

(a) providing a stored prediction value, from the fetch stage of the instruction pipeline, the stored prediction value enabling the instruction pipeline to continue processing of a particular conditional branch instruction, the step of providing a stored prediction value further comprising the steps of:

(i) providing an index counter value associated with each one of the plurality of possible fetch program counter values of the particular conditional branch instruction, each index counter value indicating one of several candidate predictions to use for a next serial instance of the same conditional branch instruction;

(ii) storing, in a number of addressable locations in a storage array, the multiple candidate predictions;

(b) determining a truth-based prediction value of the next execution instance of the conditional branch instruction, the determining step made from the contents of a retire stage of the instruction pipeline, and the retire stage occuring after the fetch stage, and the truth-based prediction value depending upon a truth value indicating an actual result of the conditional branch instruction;

(c) passing the index counter value through the instruction pipeline such that a given index counter value is passed through the instruction pipeline in a forward direction from the stored predictor to the truth based predictor, to enable the truth-based predictor to associate the truth value with a particular conditional branch instruction; and (d) ordering the the multiple prediction values provided from the truth-based predictor to the stored predictor according to the index counter value.

* * * * *